(12) United States Patent
Topalski et al.

(10) Patent No.: US 11,114,675 B2
(45) Date of Patent: Sep. 7, 2021

(54) BIPOLAR PLATE FOR FUEL CELLS, AND PRODUCTION METHOD

(71) Applicants: FRAUNHOFER-GESELLSCHAFT ZUR FORDERUNG DER ANGEWANDTEN FORSCHUNG E.V., Munich (DE); TECHNISCHE UNIVERSITAT DRESDEN, Dresden (DE)

(72) Inventors: Slavcho Topalski, Dortmund (DE); Teja Roch, Dortmund (DE); Thomas Stucky, Dortmund (DE); Axel Zwick, Hagen-Hohenlimburg (DE); Giorgio Maurizio, Witten (DE)

(73) Assignees: FRAUNHOFER-GESELLSCHAFT ZUR FOERDERUNG DER ANGEWANDTEN FORSCHUNG E.V., Munich (DE); TECHNISCHE UNIVERSITÄT DRESDEN, Dresden (DE)

( * ) Notice: Subject to any disclaimer, the term of this patent is extended or adjusted under 35 U.S.C. 154(b) by 153 days.

(21) Appl. No.: 16/484,856

(22) PCT Filed: Feb. 20, 2018

(86) PCT No.: PCT/EP2018/054122
§ 371 (c)(1),
(2) Date: Aug. 9, 2019

(87) PCT Pub. No.: WO2018/150046
PCT Pub. Date: Aug. 23, 2018

(65) Prior Publication Data
US 2019/0363372 A1    Nov. 28, 2019

(30) Foreign Application Priority Data
Feb. 20, 2017   (DE) .................... 10 2017 202 679.0

(51) Int. Cl.
*H01M 8/0206* (2016.01)
*H01M 8/0228* (2016.01)
(Continued)

(52) U.S. Cl.
CPC ....... *H01M 8/0206* (2013.01); *H01M 8/0228* (2013.01); *H01M 8/0247* (2013.01); *H01M 2008/1095* (2013.01)

(58) Field of Classification Search
CPC .................. H01M 8/0206; H01M 8/0228
(Continued)

(56) References Cited

U.S. PATENT DOCUMENTS 6,153,327 A * 11/2000 Dearnaley ............ C23C 16/486
   429/487
2004/0106029 A1   6/2004 Iqbal et al.
(Continued)

FOREIGN PATENT DOCUMENTS

DE   10 2011 109909   2/2012
DE   11 2010 004990   3/2013
(Continued)

OTHER PUBLICATIONS

Yi et al. Composition optimization of multilayered chromium-nitride-carbon film on 316L stainless steel as bipoloar plates for proton exchange membrane fuel cells, Journal of Power Sources, vol. 236, Feb. 21, 2013, pp. 47-53.
(Continued)

*Primary Examiner* — James M Erwin
(74) *Attorney, Agent, or Firm* — Jacobson Holman PLLC

(57) ABSTRACT

The bipolar plate of the invention for electrochemical cells, especially for proton-exchange membrane (PEM) fuel cells, is made with a metallic substrate and on the surface is made with an electrical contact resistance-reducing, carbon-based layer, a layer system or a boundary layer which is made of
(Continued)

a near-surface, primarily sp2-bonded, carbon-based layer having a carbon fraction ranging from 50% to 100%, this layer being applied on a metallic substrate surface that is modified relative to the starting material. There may also be a surface region of the substrate in the form of an edge layer made with nitride and/or carbon by nitriding and/or carburizing. On the surface which is in touching contact with a gas-permeable element within the electrochemical cell, the metallic substrate may have a structuring made with elevations and/or depressions in the respective surface.

17 Claims, 5 Drawing Sheets

(51) Int. Cl.
  *H01M 8/0247* (2016.01)
  *H01M 8/1018* (2016.01)
(58) Field of Classification Search
  USPC .......................................................... 429/535
  See application file for complete search history.

(56) References Cited

U.S. PATENT DOCUMENTS

| 2012/0231374 A1* | 9/2012 | Iseki | C01B 32/05 |
| | | | 429/518 |
| 2014/0051012 A1 | 2/2014 | Hsieh et al. | |
| 2014/0302416 A1 | 10/2014 | Lee et al. | |

FOREIGN PATENT DOCUMENTS

| DE | 10 2016 102393 | 8/2016 |
| DE | 10 2015 122747 | 3/2017 |
| DE | 10 2016 111224 | 8/2017 |
| EP | 2913876 | 9/2015 |
| KR | 20140122114 | 10/2014 |
| WO | 01/28020 | 4/2001 |
| WO | 2014/173750 | 10/2014 |

OTHER PUBLICATIONS

Wu et al. Chromium nitride films on stainless steel as bipolar plate for proton exchange membrane fuel cell. Jounral of Power Sources, vol. 194, No. 2, Jun. 18, 2009, pp. 976-980.
Korean Office Action.

* cited by examiner

GDL  Metal

GDL  Modified surface
 Metal

GDL  Modified surface
 Metal

GDL  Modified surface
 Metal

GDL  Metal

Carbon layer

C subplantation zone

Cr layer

1% = Metal with chromium content > 1%

C subplantation zone

Remnants converted CrOx passivation layer

1% = Metal with chromium content > 1%

Carbon layer

C subplantation zone

1% = Metal with chromium content > 1%

Carbon layer

Remnants converted CrOx passivation layer

1% = Metal with chromium content > 1%

- C subplantation zone
- Remnants converted CrOx passivation layer
- 1% = Metal with chromium content > 1%

- Carbon layer
- Plasma-nitrided metal
- 1% = Metal with chromium content > 1%

- Carbon layer
- Cr layer
- Plasma-nitrided metal
- 1% = Metal with chromium content > 1%

BIPOLAR PLATE FOR FUEL CELLS, AND PRODUCTION METHOD

BACKGROUND OF THE INVENTION

The invention relates to a bipolar plate for electrochemical cells, especially for polymer electrolyte fuel cells or proton-exchange membrane (PEM) fuel cells, and to a production method. Fuel cells are used for obtaining electrical energy from a fuel and an oxidant through an electrochemical reaction. Proton-exchange membrane (PEM) fuel cells (PEMFCs) are suitable especially in the context of mobile applications, such as in vehicles, for example. Another possibility which exists, however, is that of operating electrochemical cells in such a way that electrical energy is used to initiate an electrochemical reaction wherein hydrogen can be obtained as a reaction product.

The term "fuel cell" generally is to be used hereinafter, however, and of course this term should also be understood to embrace other electrochemical cells.

Bipolar plates (BiPs) serve within the fuel cell for supply of hydrogen and oxygen and for draining of water/cooling water, and also for tapping of liberated electrons from the electrodes of the respective fuel cell in order to provide an electrical voltage.

A fuel cell supplies, between the two electrodes, a useful electrical voltage of 0.5 V-2.0 V. It is important that the electrons liberated as a consequence of the electrochemical reaction can be taken up extremely efficiently on the hydrogen side (anode side) and be supplied extremely efficiently again to the process on the oxygen side (cathode side). This means that any electrical contact resistances or volume resistances occurring are extremely small. An electrical resistance at this point has a direct influence on the efficiency of the BiP and therefore of the fuel cell.

Disposed between a bipolar plate and the membrane, as solid electrolyte, is a gas-permeable element, which may also be referred to as gas diffusion layer (GDL) and that is, for example, a textile structure of open porosity, which is preferably made of or with electrically conducting fibers, especially carbon fibers. A gas-permeable element fulfills the functions of distributing gas, emerging from channels of a BiP, over the surface of the membrane, such distribution being homogeneous and as far as possible over the full area, and of transporting the electrons delivered as fuel by the hydrogen to the BiP, and transporting the electrons supplied by the BiP to the water which forms on the oxidant side.

In order to minimize the electrical transfer resistance for the electrons (and hence the losses), on the one hand the electrical contact resistance of the BiP ought to be extremely low, and on the other hand the GDL must be pressed with a high areal pressure against the BiP, in order to maximize the number of contact points and hence electrical current paths that are formed. At the same time, process water arising must be carried away and the membrane assembly must be humidified. It is known that the electrical contact resistance (and hence the loss) drops as the areal pressure increases. The areal pressure, however, cannot be increased ad infinitum, since in that case the membrane and the BiP, which advantageously is made of an extremely thin metal sheet, preferably a stainless steel sheet, suffer damage mechanically.

The contact resistance of the BiP can be lowered by surface-modifying the metal used for producing a BiP (e.g., rust-resistant and acid-resistant, steels). Given sufficient corrosion prevention by surface modification, it is even conceivable to use metals with relatively low protection from rust and corrosion. For this there are a variety of options:

The electrical transfer resistance is typically relatively large, owing to the natural, poorly conducting passive layer on the surface of the metal, particularly in the form of a chromium oxide layer in the case, for example, of rust-resistant and acid-resistant steel. Mechanical, chemical and/or physical removal of a passive layer before commissioning does not provide any satisfactory improvement, and this layer regenerates very quickly.

Raising the pressure applied to a BiP causes the GDL to compact and to be pressed more strongly onto the surface of the BiP. Increasing the applied pressure, however, is subject to limits, owing to the sensitivity of the membrane, to the need not to compact the GDL too much, in order to ensure sufficient gas diffusion, and to the mechanical stability of the BiP. As described later on, however, the mechanical stability of the BiP plate here can be enhanced through suitable surface finishing.

SUMMARY OF THE INVENTION

It is an object of the invention, therefore, to specify options for a lasting reduction in the electrical contact and/or transfer resistance between a surface of a bipolar plate that is made of a metal, more particularly of a stainless steel, and a gas-permeable element (GDL) of a fuel cell which are in touching contact with one another, where the costs of production can be kept within an acceptable window.

This object is achieved in accordance with the claims.

The bipolar plate of the invention for electrochemical cells, especially for proton-exchange membrane (PEM) fuel cells, is made with a metallic substrate. The substrate is provided at the surface with an electrical contact resistance-reducing, carbon-based layer, a layer system or a boundary layer, which is made of a near-surface, primarily sp2-bonded, carbon-based layer having a carbon fraction ranging from 50% to 100%, this layer being applied on a metallic substrate surface that is modified relative to the starting material.

On its own or additionally, a surface region of the substrate may be present as an edge layer, which is made with nitride and/or carbon by nitriding and/or carburizing.

In a further alternative of the invention, which may be present on its own or additionally, the metallic substrate, on the surface which is in touching contact with a gas-permeable element within the electrochemical cell, has structuring which is made with elevations and/or depressions in the respective surface.

The substrate may advantageously have a specific surface area and/or roughness that is increased by at least 10% relative to a flat-rolled surface.

Advantageously there is an adhesion-promoting and corrosion-reducing layer of chromium or of titanium, or an edge zone enriched with chromium and/or titanium, having a thickness ranging from 2 nm to 200 nm, formed on the surface of the substrate as an interlayer beneath a carbon-based layer, a layer system or a boundary layer.

The carbon-based layer or the carbon-enriched layer may be formed on an edge layer, enriched with chromium and/or with nickel, on a surface of a substrate which consists preferably of stainless steel.

Another option is that of a transition zone with a carbon gradient, formed between the carbon-based layer or the carbon-enriched layer and the substrate surface.

Individual elevations and/or depressions on the substrate surface ought to have dimensions and geometrical design such that fibers with which the gas-permeable element is made, as a textile structure, are in touching contact over their outer periphery with at least 10% of their outer lateral surface, in a region of the substrate surface in which a depression is present and in which a fiber and the substrate surface touch one another; here, preferably, depressions are formed in the substrate surface with identical orientation and with constant distances between adjacent depressions.

On the surface which is in touching contact with a gas-permeable element within the electrochemical cell, a metallic substrate may have a structuring made with elevations and/or depressions in the respective surface.

In the case of the method for producing a bipolar plate, the procedure may be such that at least one of the following steps is carried out:

A structuring is formed on the substrate surface in contact with a gas-permeable element, this structuring being in touching contact with a gas-permeable element in a fuel cell, with elevations and/or depressions on this surface. This may be attained by erosion of material and/or by an embossing method.

The respective substrate surface is vacuum-coated with a graphitic, carbon-based layer, a layer system or a boundary layer, which is made preferably completely closed with a plurality of atomic layers disposed one above another, by means of a plasma which is generated preferably with an electric arc discharge.

An edge layer is formed on the respective substrate surface by a nitriding, carburizing or carbonitriding method, with maintenance of an atmosphere suitable for this purpose, by means of a plasma; in the case of carbonitriding, the edge layer is preferably first nitrided and thereafter carburized.

An increase in the roughness and the specific surface area of the substrate surface which is in touching contact with a gas-permeable element within a fuel cell can advantageously be attained by means of an etching method.

Before the application of a graphitic, carbon-based layer, a layer system or a boundary layer, or the formation of an edge layer, it is advantageous for an oxide layer present on the substrate surface to be at least partially removed. Removal may be carried out preferably by means of an etching operation in argon or nitrogen or reduction of the oxide in an atmosphere, which more preferably is a hydrogen-containing atmosphere. Here, complete removal of an oxide layer may be advantageous. In the case of chromium oxide layers in particular, however, partial removal may be advantageous. It is possible to utilize partial conversion of the chromium oxide in order, in the case of rust-resistant and acid-resistant steels, for example, to utilize the accumulation of the metal of which the passivating layer is made—for example, to utilize chromium there for corrosion prevention in the event of damage to the carbon-rich and nitrogen-rich zone lying above it.

In one embodiment, an adhesion promoter layer, preferably in the form of a thin layer of chromium or titanium or of a layer made with chromium and titanium, can be formed on the substrate surface before the application of the graphitic, carbon-based layer, a layer system or a boundary layer, preferably by means of an electric arc discharge operation under vacuum.

The graphitic, carbon-based layer, a layer system or a boundary layer may be formed with ionized and accelerated carbon ions, which strike carbon atoms present on the substrate surface at temperatures ranging from 80° C. to 600° C., preferably ranging from 200° C. to 500° C., in particular with a layer thickness <80 nm. In this case it is possible to attain at least almost 100% ionization of the carbon by means of a pulsed arc evaporator. It is advantageous here for highly ionized and accelerated carbon ions to strike carbon atoms on the surface at the elevated temperatures. The layer here ought to be applied to a carbon-subplanted layer. To minimize emergence of metal ions and so to prevent poisoning of the membrane assembly, there ought to be no metallic constituents installed. The bias voltage selected here ought to be lower than in the case of subplantation.

In the case of simultaneous subplantation or implantation of carbon and nitrogen, in one belt run, the electrons of an evaporator for carbon, preferably of a light arc evaporator, may be utilized under vacuum in order to ionize nitrogen using auxiliary electrodes. The nitrogen ions can then be accelerated in the metal-sheet surface direction, using a bias voltage. At the same time, the highly ionized carbon of the evaporator with equal bias voltage may likewise be incorporated into the metal surface.

The process of diffusion of the nitrogen into the depth of the substrate material may be accelerated by impinging carbon ions, or the process of carbon diffusion may be accelerated by impinging nitrogen ions. In the case of such an operation, it is also possible to forgo the removal of the chromium oxide layer.

The plasma nitrocarburizing for forming the edge layer may be carried out in a near-vacuum, nitrogen-containing atmosphere, at a pressure ranging from $10^{-1}$ mbar to $10^{-3}$ mbar, by a nitriding treatment in which nitrogen ions are accelerated in the direction of the substrate surface. In this case, preferably, the substrate is subject to an electrically negative bias voltage ranging from 500 V to 1000 V, or the substrate has connection to ground potential. A temperature ranging from 350° C.-500° C. ought to be observed.

Plasma-nitrocarburized layers, as hard edge layers, may be formed such that a higher applied pressure can be exerted on the bipolar plate and hence improved electrical contact resistances are achievable. Instead of higher applied pressures, it is also possible to use thinner metal sheets as substrates, with the same applied pressures. Plasma-nitrocarburized surfaces can also be utilized as corrosion-resistant surfaces with good adhesion for carbon layers.

Surface layer systems or surface layer structurings may be produced in a strip finishing operation, without substantial detractions from the performance in the fuel cell, and thereafter the striplike substrate material treated accordingly may be reshaped into bipolar plates. In this case, edge layers may be drawn and thinned out in the zone of maximum degrees of forming.

Because of the surface modification on substrate surfaces, less expensive substrate materials may be used.

Depressions in the structured substrate surface may be irregular in form. Preferably, however, they are formed with the same orientation and at constant distances between adjacent depressions. These depressions or surface structures may advantageously be such that in regions of the BiP which are not in immediate contact with the GDL, there is a preferential flow direction of reaction products of the fuel cell process out of the active region.

In this working example, the surface structure would have anisotropic properties and be implemented accordingly. Furthermore, advantageous properties of such structuring may include the possibility of improved electrical contacting in the event of no regular contact between GDL and BiP and hence a lack of electrically conducting contact or a reduced applied pressure between GDL and BiP.

On the surface which is in touching contact with the gas-permeable element and is structured and/or formed with increased roughness, a layer or edge zone, made preferably with amorphously graphitic or nanostructured or microstructured carbon, may be applied, for further increasing the electrical conductivity and/or for reducing the electrical contact resistance. On its own or additionally, an edge layer made with nitride and/or carbon, by nitriding and/or carburizing, especially by plasma nitrocarburizing, may be formed on the surface of the BiP.

A graphitic carbon layer ought preferably to be made completely closed with a plurality of atomic layers, or structures, disposed one above another or, preferably, adjacently, especially perpendicular to the BiP surface. This layer may be formed under vacuum by means of a plasma, which is generated preferably with an electric arc discharge. The plasma is to be formed preferably as a pulsed plasma with virtually 100% degrees of ionization. In this case, a high energy input and hence temperature of the process, and/or external heating sources, ought to ensure that the carbon layers are formed graphitically (sp2 bonding). These are, by way of example, surface temperatures ranging from 50° C.-500° C., preferably of around 300° C. High ionizations and applied acceleration voltages (bias) between evaporator and substrate metal surface mean that the ions impinge on the surface with high energies of preferably >100 eV on carbon. This leads to particularly advantageous structures of the carbon layers in respect of electrical contact resistance and strength of attachment. For the formation of sp2 bonded layers with low electrical contact or specific resistance, the ratio between temperature, vacuum pressure (optionally with process gas), and acceleration voltage of the carbon ions is important—if pressures are too high, the formation of layers of advantageous electrical conductivity may be suppressed. Through a suitable choice of parameters it is also possible, in the boundary value, to produce suitable carbon layers at room temperature.

The acceleration voltage selected here ought typically to be lower than in preceding carbon subplantation operations for boosting the strength of attachment. For a particularly high strength of attachment it is advantageous, before coating with carbon, to implant and/or subplant highly ionized carbon into the surface by means of high acceleration voltages (e.g. 1000 V). As in the case of a plasma-nitrocarburized layer, such layers may already also be used as a carbon electrode (layer thickness or edge-layer thickness 1 nm-20 nm).

A further graphitic carbon outer layer ought as far as possible to be implemented as a thin layer of, for example, <80 nm. To minimize emergence of metal ions and so to prevent poisoning of the membrane assembly, no metallic constituents ought to be installed.

Because of the operation of the arc discharge under vacuum, carbon particles may also occur in the layer, and/or there may be defects resulting, such as vacancies. In the case of filtered deposition, with a magnetic filter, for example, or of deposition by means of alternative PVD methods, such as a sputtering operation, for example, it is also possible to produce virtually particle-free layers with carbon.

Between the structured surface of a substrate and a layer or an edge layer, there may be an interlayer, especially a chromium layer, allowing the adhesion of the carbon layer and the corrosion resistance of the BiP to be improved. Especially in the region of cracks, local defects and/or weld seams, a chromium interlayer may ensure the formation of a stable chromium passivation layer. By this means it is possible to prevent both corrosion and the emergence of iron ions, which may poison the membrane assembly of an electrochemical cell, and it is possible to improve the suitability for forming. In the event of excessive contamination of the membrane assembly with chromium ions, the chromium layer may be replaced, for example, by a titanium layer. It is, however, also possible to select an interlayer which is made both with chromium and with titanium.

As a cleaning operation for eliminating the oxide layers prior to vapor deposition of the adhesion promoter layer, preferably a chromium layer, it is possible for the surfaces to be cleaned beforehand by means, for example, of metal ion sputtering.

One advantageous variant of the production of a BiP is to implement the coatings and surface structurings in strip material and thereafter to form, cut into shape, and weld this strip material in subsequent operations. For a strip process of this kind it is advantageous to extract the strip from a conventional strip annealing operation with a reducing atmosphere (e.g., suitable hydrogen content) under inert gas conditions. Here it is possible, without additional steps of working, to ensure complete or partial reduction of the oxide layer, chromium oxide for example, and the strip heat can be utilized in the further course of the operation. An operation of this kind can be carried out in a vacuum chamber by etching in a hydrogen-containing gas.

It is particularly advantageous to utilize the chromium enrichment, which occurs typically in the passivating interlayer in the case of stainless steel, after a reducing treatment, instead of a chromium adhesion promoter layer.

A possible procedure in the production of a BiP of the invention is that a structuring of the surface, in contact with a gas-permeable element, of a BiP which is in touching contact with a gas-permeable element (GDL) in a fuel cell is formed with elevations and/or depressions on this surface, by means of erosion of material and/or by an embossing method. The structuring may alternatively be brought about by the interaction of the surface treatments with high degrees of forming of the metal sheet for the purpose of forming the flow field geometry.

Material may be eroded with at least one laser beam, preferably by interference of two or more laser beams in an irradiated region of the respective surface of the BiP. In this case, advantageously, a locally defined erosion of material can be achieved in a very short time. Accordingly, a wide variety of different patterns can be obtained in defined form on the surface, by structuring, thereby providing a relatively high level of flexibility.

The roughness and specific surface area of the respective substrate surface for a BiP can be increased by bombardment with ions, which preferably have an energy ranging from $10^2$ eV to $75*10^3$ eV, under reduced pressure.

An edge layer can also be formed on the respective substrate surface of a BiP by means of a nitriding, carburizing or nitrocarburizing process, observing a temperature and atmosphere suitable for this purpose, by means of a plasma. An edge layer may preferably be obtained by nitrocarburizing in such a way that the edge layer is first nitrided and subsequently carburized. Here it is advantageous that by this means, additional hard edge layers are also generated, which hinder the deformation of the bipolar plate in the formed state and so permit the use of thinner metal sheets or higher applied pressures.

An improvement in the electrical current transfer from the GDL to the BiP without an increase in the applied pressure can be achieved through combination of a microstructuring of the surface of the BiPs with a chemical alteration (coating, nitriding). This increases the size of the surfaces which are in touching contact with one another, thus allowing the intrinsic electrical surface resistance to be reduced.

The extent of the structuring may either be stochastic, i.e., random, by means of an etching operation, for example, or deterministic, by laser structuring or an embossing operation. Particularly advantageous here is the combination of erosion of material by laser structuring or an embossing operation, and the subsequent etching of the substrate surface.

An advantage of the solution described is that it is possible to achieve lower electrical contact resistances than with gold-coated surfaces. Accordingly, substantial cost savings and efficiency boosts for BiP are possible. Further cost savings in the production of the surface structures and the edge layers lie in the implementation of the operating steps in a strip operation, particularly in roll-to-roll working and the subsequent working of the finished strip material to form BiP and/or fuel cells. Firmly attaching layers of this kind can be produced on strip material and subsequently formed, without significant impairment to performance in the fuel cell.

The edge layers here can be drawn and thinned out in the zone of very high degrees of forming. In these regions there may also be development of a forming-induced characteristic cracking structure of the coating or edge layer, respectively.

On account of their electrical properties and the corrosion prevention effect, surface structurings and/or surface layers or surface layer systems may be utilized in order to allow the use of more inexpensive metals in fuel cells. These include, for example, metal strips made of 1.4301 or else ferritic steels.

Furthermore, the combination of the methods of surface structuring with a surface coating offers the advantage of further-reduced electrical contact and transfer resistances and also of increased corrosion resistance by virtue of the surface functionalization.

A BiP may, by way of example, be produced as follows:

The structuring may be formed, for example, by means of an Nd:YAG laser beam operated with ns pulsing. This laser beam is guided onto the surface, for example, with a pulse length of 10 ns, a wavelength of 1064 nm, and a pulse energy of 1 J. The laser beam may additionally be modified via laser optics between the laser source and the BiP surface. By splitting of the original laser beam, for example, it is possible here to obtain two laser beams, which are superimposed (with interference) again on the surface of the substrate. The superimposing and focusing may be carried out such that pulse energy densities (laser fluences) of around 2 J/cm$^2$ are attained in the area irradiated. The angle between the interfering component laser beams may be selected so that the resulting interference period corresponds to 20 µm on the surface. By this means it is possible to generate linear structures having a period of 20 µm. The structure depths in this case are around 1 µm-10 µm.

In the case of metal ion sputtering for forming a structure on the respective substrate surface, the surface in question may be eroded by bombardment with ions of sufficient energy ($10^2$ eV up to several $10^3$ eV). On this basis, there is a transfer of impulse of an impinging ion with the substrate surface.

As a result of elastic "nuclear repulsions", the impulse is infused into the substrate material, and initiates a collision cascade. As a result, surface atoms may acquire an outwardly directed impulse. Where the kinetic energy of the incoming ions exceeds the bonding energy of the atoms in the substrate material, these atoms may be atomized from the substrate surface, predominantly in the form of individual atoms, but also in the form of atom clusters. The structure depths in this case are around 0.05 µm-2 µm.

The application of a high electrical voltage (bias voltage) to the substrate, which advantageously is disposed in a vacuum chamber in the pressure range from $10^{-5}$ mbar-$10^2$ mbar, generates a low-pressure plasma by means of noble gases. With a mixture of excited metal ions and gas ions, the high-energy particles generated can be accelerated by the applied electrical current potential in the direction of the substrate surface and, accordingly, material can be eroded from the surface. In this way it is possible to realize precision plasma cleaning of the surface of a substrate for a BiP, and to increase the surface roughness of the surface thus influenced.

A structured surface of a substrate may additionally be provided with a coating made of at least one layer.

The metallization of metallic surfaces for the purpose of passivation is known in principle. For example, metal surfaces are plated with zinc or chrome to provide them with long-term protection from corrosion. Within the fuel cell, high redox potentials sometimes occur, depending on operating state, and these redox potentials are very aggressive and may bring about instances of damage and/or chemical processes. Where metal-based BiPs are used, they may corrode. The goal in the case of a metallic BiP is to increase the corrosion resistance and to ensure good electrical conductivity.

This may be achieved by deposition of a carbon-based, graphite like layer or layer system of this kind.

A coating may also be formed by modification of the edge layer of a metallic substrate or a metal strip. This may be achieved by plasma nitriding, as a thermochemical treatment of the surface of steels using, for example, nitrogen at relatively high temperatures (T=200° C.-900° C.). Plasma nitriding is normally employed to improve the wear properties. In the case of nonrusting steels, specifically, the binding of chromium to form chromium nitride (CrN) may cause the corrosion prevention effect of the continually renewing chromium oxide passivation layer to be lost.

It is advantageous to carry out the plasma nitriding in the form of highly ionized N ions, accelerated by a bias voltage, at workpiece temperatures ranging from 300° C.-500° C. One suitable method in this case may be that of arc-assisted glow discharge. In this operation, an arc evaporator generates electrons and accelerates them in the direction of an additional cooled anode, while ions which form can be shielded. Excited by the stream of electrons, nitrogen is ionized above the surface to be treated, at pressures ranging from $10^{-1}$ mbar-$10^{-3}$ mbar, and this ionized nitrogen is accelerated onto the substrate, which is either at ground potential (earth) or has a negative bias voltage of around 200 V-5000 V. The N ions impinging on the passivation layer, preferably a chromium oxide layer in the case of austenitic steels, may undergo near-surface implantation/subplantation and/or inward diffusion. The surface in this case is cleaned at the same time. In combination with carbon implantation or subplantation carried out afterward or at the same time, an edge layer with high carbon and nitrogen contents can be formed here. The carbon here is implanted preferably using light arc evaporators and high acceleration voltages >500 V.

In the case of the simultaneous subplantation or implantation of carbon and a nitriding, the electrons of a carbon evaporator, preferably a light arc evaporator, may be utilized under vacuum in order to ionize nitrogen and introduce it in parallel into the substrate surface. The nitrogen ions may then be accelerated with a bias voltage in the substrate surface direction. At the same time, the highly ionized carbon may be introduced with the evaporator, with the same bias voltage, likewise into the metal surface of the substrate.

In contrast to other methods, in which additional chromium is applied or gas nitriding is operated at nitriding temperatures >800° C., the chromium content may fall toward the surface (FIG. 4). In this case, the modification of the edge layer may optionally be confined to the near-surface part of the passivation layer, to 10 nm-20 nm, for example. It is, however, also possible to achieve depths of modification in the region of 5 µm. The carbon implantation and/or subplantation process may be utilized to drive the nitrogen quicker into greater depths and/or to modify the passivation layer. The energy supply of the carbon process, moreover, is one of the contributing factors in ensuring a suitable temperature regime for nitrogen diffusion processes that occur.

On such surfaces it is also possible, additionally, to deposit carbon layers with good strength of attachment. Even without such carbon layers, however, it is possible to achieve equally good, or better, contact resistances before and after the stacking test, as compared with gold layers.

In the plasma nitrocarburizing process described here, as well, it is possible to utilize clean substrate surfaces from a reductive annealing operation in an upstream manufacturing operation, including the residual heat from such an operation, if the manufacturing operations can be coupled without exposure to oxygen.

DESCRIPTION OF THE DRAWINGS

The intention of the text below is to elucidate the invention in more detail, with examples.

In the drawings.

DETAILED DESCRIPTION OF THE INVENTION

FIG. 1 shows a number of examples of the surface which are in touching contact with a gas-permeable element within a fuel cell. Shown in FIG. 1A is a conventional planar surface of a substrate 1 of a bipolar plate, and of a fiber 2 of a gas-permeable element, formed as a textile with fibers 2, without structuring, in accordance with the prior art.

Figure 1A:
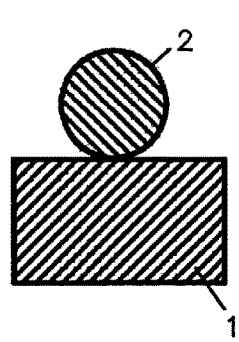
FIG. 1 consists of FIGS. 1A, 1B, 1C, 1D, and 1E showing examples of structured surfaces of bipolar plates with in each case one fiber of a gas-permeable element in the form of a textile structure.
Figure 1A:
Figure 1A:
Figure 1B:
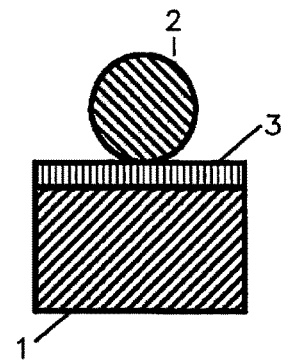
Figure 1B:
Figure 1B:
Figure 1B:

FIG. 1B shows a flat planar surface of a substrate 1 of a bipolar plate that is coated with a layer 3 in contact with a fiber 2 of a gas-permeable element.

Figure 1C:
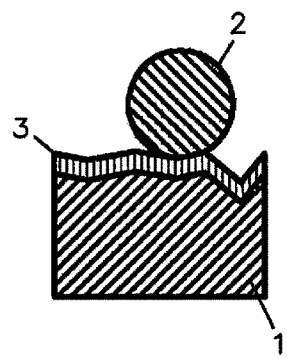
Figure 1C:
Figure 1C:
Figure 1C:

An irregularly structured surface, modified or coated with a layer 3, of a substrate 1 of a bipolar plate, where a fiber 2 of the gas-permeable element is located in a depression in the structuring, and here, in the region of the depression, the fiber 2 is in touching contact of 20% of its periphery, with the structured surface of the substrate 1 of the bipolar plate, is shown in FIG. 1C.

Figure 1D:
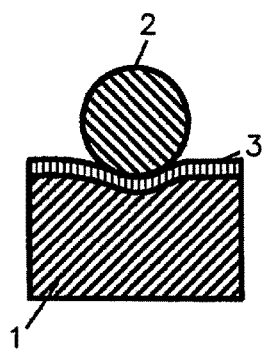
Figure 1D:
Figure 1D:
Figure 1D:
Figure 1E:
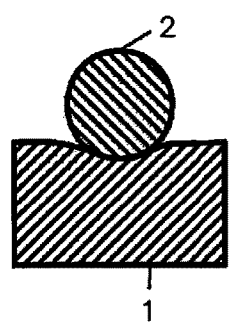
Figure 1E:
Figure 1E:

FIGS. 1D and 1E are intended to illustrate examples of a regularly structured surface of a substrate 1 of a bipolar plate. Here, in a form not illustrated, a number of depressions are formed in the surface of the substrate 1 of the bipolar plate. The depressions each have the same dimensioning, are oriented in the same direction, and are formed each with equal distances from one another. In each depression at least a part of a fiber surface of a gas-permeable element in the form of a textile structure has been introduced, and so there the surface of fibers 2, of at least 20% of their outer lateral surface, is in touching contact on the surface of the bipolar plate 1 (see FIG. 1E) or on the surface of a layer 3 or surface modification which has been formed on the surface of the substrate 1 of the bipolar plate.

Layers 3 as shown in FIGS. 1B to 1D may be made—as will be described below in relation to FIGS. 3A to 3G—in the form of a layer system 3, a plurality of layers formed one above another, or elements implanted or diffused into the surface, or of a combination thereof.

Figure 2A:
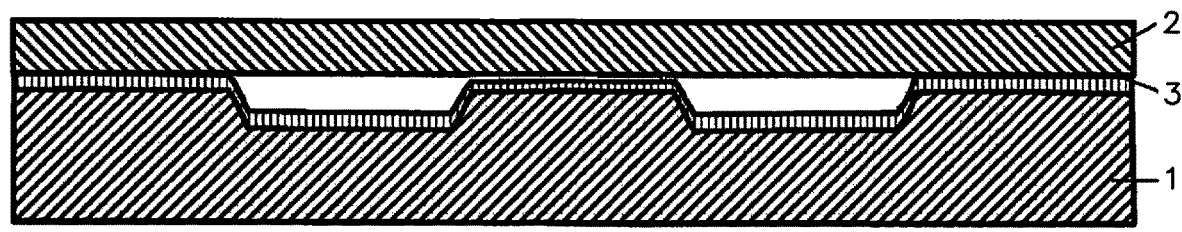
FIG. 2 consists of FIGS. 2A and 2B showing an example of a structured surface or a surface with increased roughness.
Figure 2B:
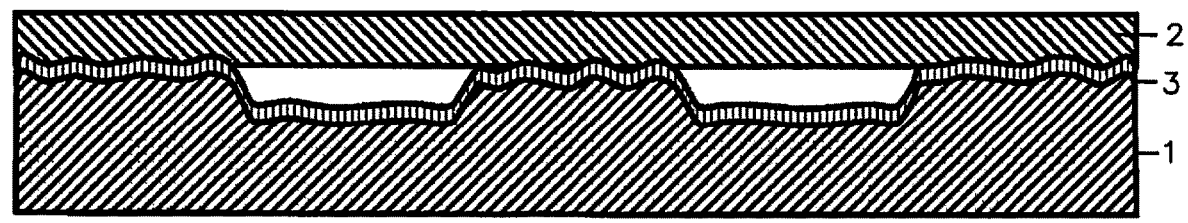

FIG. 2A shows, diagrammatically, the surface 3 of a substrate 1 of a bipolar plate having a smooth structure which, on the basis of an inaccuracy in fabrication or assembly, is not in universal contact with the GDL 2—which is made, for example, with fibers 2.1—of the membrane assembly of an electrochemical cell. This causes a worsening of the electrical current transfer. In FIG. 2B it is shown that the GDL 2 with the fibers 2.1 is better able to conform to a structured surface and as a result has better contact to the modified surface 3.

Figure 3A:
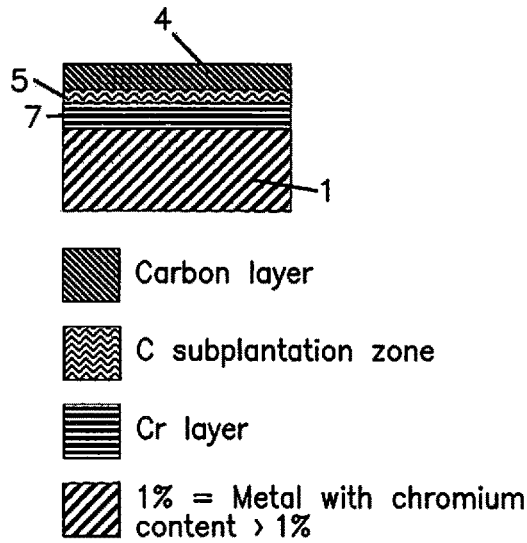
FIG. 3 consists of FIGS. 3A, 3B, 3C, 3D, 3E, and 3G showing examples of bipolar plates formed with a coating and/or edge layers.

Thus FIG. 3A shows a bipolar plate with a substrate 1 composed of 1.4404 stainless steel, a layer system being disposed on the surface of said substrate, that surface being in touching contact with the gas-permeable element 2 when an electrochemical cell has been assembled. After cleaning of the surface to remove impurities and oxides, by means of metal ion sputtering, for example, a PVD method, by means of an arc evaporator, for example, is used to deposit chromium. Carbon is vaporized into the chromium layer 7 as an adhesion-promoting component at temperatures between 200° C.-500° C., by means of pulsed or DC arc evaporator, and in ionized form is implanted or subplanted with high negative bias voltages (e.g., 1000 V). This forms a carbon-rich surface layer or a carbon layer 5 obtained by subplantation. Using a pulsed arc evaporator, highly ionized carbon is subsequently deposited at lower bias voltages (e.g., <500 V). Based on the high degree of ionization and the high energies of the impinging ions, and also on the resultant surface tensions and the temperature, a highly conductive nano- or microstructured carbon layer 4 is formed on the surface.

The layer system or the surface modifications in FIGS. 3A to 3G on a substrate surface of a bipolar plate may be formed on a structured surface having depressions and/or elevations, something which, however, is not shown in these depictions. The layers 4, 5, 6, 7, 8 and 9 are each depicted on a planar strip surface of a substrate 1, prior to a forming operation. Alternatively they may be realized on bipolar plate substrates 1 that have already undergone forming.

Figure 3B:
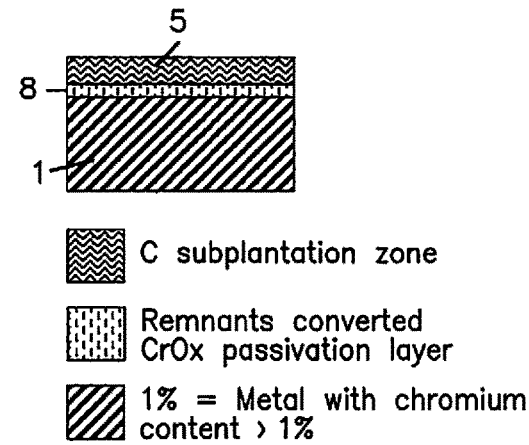
Figure 3C:
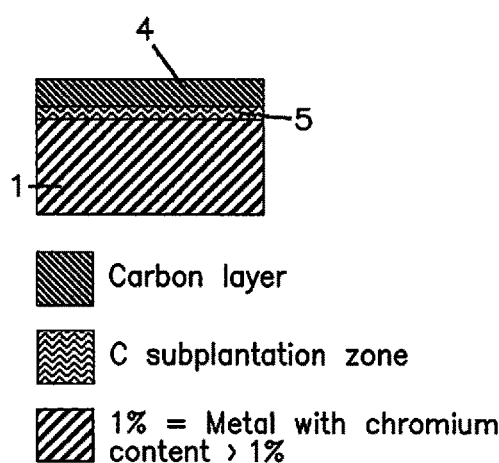
Figure 3D:
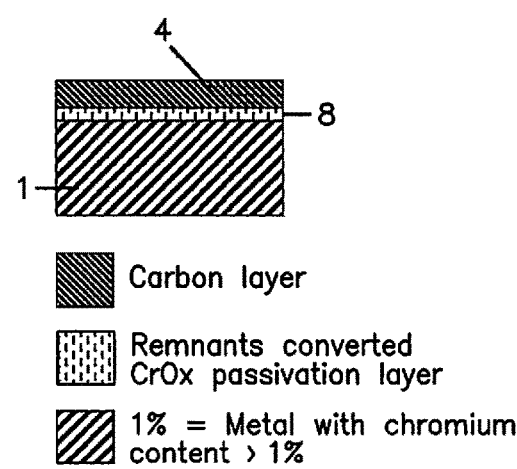
Figure 3E:
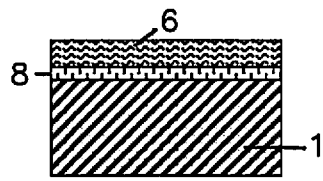

In the case of the example shown in FIG. 3B, the chromium passivation layer 8 has not been completely removed, but instead has undergone only partial conversion, near to the surface, with a consequent reduction in the oxygen fraction. This can be done by annealing in hydrogen atmospheres or else by etching operations. The carbon layer 5 is then implanted or subplanted, without a chromium interlayer 7, into the chromium-rich former chromium oxide passivation layer 8, as described above. Here, on the surface of the former oxide layer, a very carbon-rich surface is formed, which may still contain fractions of the metal of which the substrate 1 is made; the relative chromium fraction and nickel fraction is increased, and additionally oxygen may occur.

In the case of example 3C, the chromium oxide passivation layer 8 is removed completely, or to an extent of at least 80%, before coating, by means of an etching operation, for example, and then a carbon layer 5 is applied which is obtained by subplantation and has a thickness <20 nm, as described above. Atop this layer, the carbon layer 4 described in example 3a is deposited (layer thickness 10-80 nm).

In example 3D, the chromium passivation layer 8 described is applied to a surface which has been cleaned or partially converted as explained in example 3B, with a consequent reduction in the oxygen fraction. Subsequently a carbon layer 4 is applied without prior implantation or subplantation of carbon.

Example 3E comprises a typical plasma-nitrocarburized surface. With a clean steel strip as substrate 1, prior plasma etching was not carried out in this case. At temperatures ranging from 350° C.-500° C. in the pressure range from $10^{-1}$ mbar-$10^{-3}$ mbar, the edge layer 6 is partially converted by the simultaneous subplantation or implantation of carbon and nitrogen ions. This also results in a certain cleaning effect, for existing water skins or organic material, for example. Close to the surface, high carbon concentrations are obtained, with moderate introduction of nitrogen. The nitrogen ionization here may be accomplished by a glow discharge in a nitrogen atmosphere, excited by electrons from an arc evaporator. For this purpose it is possible to utilize carbon evaporators or else chromium evaporators or other arc-evaporating substances. The nitrogen ions and the carbon ions are accelerated by high bias voltages (e.g., 1000 V) to the surface. The operations may be carried out simultaneously or else in series. The ions here, especially the carbon ions, may be utilized in order to ionize the nitrogen and also, advantageously, to support diffusion into the metal surface. The aim, if possible, is to treat only thin edge layers 6 in the <100 nm region. On the surface, as few metal ions as possible ought to remain. For all nitriding operations or carbon implantation procedures, a suitable temperature regime ought to be used to prevent the excess formation of CrN or CrC, respectively. Formed on the surface here is a very carbon-rich surface (50%-99%) with relatively low nitridic fractions (1%-20%), which may still include fractions of the base metal of the substrate 1 (e.g., Fe: 0-20%, Cr: 2%-30%, Ni: 1%-10%), with a relative increase in chromium and nickel fractions and with the possible additional occurrence of oxygen.

In the case of example 3F, a pure nitriding process takes place, without carbon, as described in example 3E. This process is carried out for longer, allowing greater depths of penetration. This edge layer 9, formed by nitriding, then enables the firmly attached deposition of a carbon layer 4, as described in example 3A. Again it is possible optionally to do without prior removal or conversion of a passivation layer 8. Such layers can then also be implemented in depths of up to 5 µm. In the case of all nitriding operations, a suitable temperature regime ought to prevent the excessive formation of CrN.

Figure 3F:
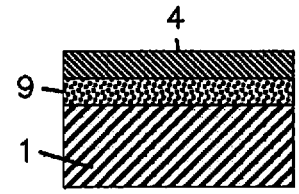
Figure 3G:
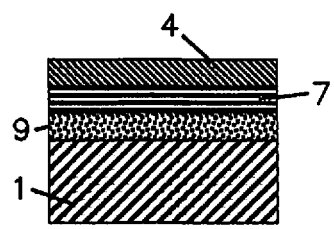

In FIG. 3G, the layer system according to FIG. 3F is supplemented by a chromium interlayer 7 which is, for example 40 nm. This layer is deposited as described in 3A. Chromium interlayers 7 of this kind may be utilized especially in the case of steels of relatively low chromium content in order to ensure sufficient corrosion resistance in the event of damage to the outer layer (cracks, scratches, etc.). Such chromium interlayers 7 can also be utilized in the case of laser weld seams in order to alloy-on an upper weld seam bead with chromium.

Figure 4A:
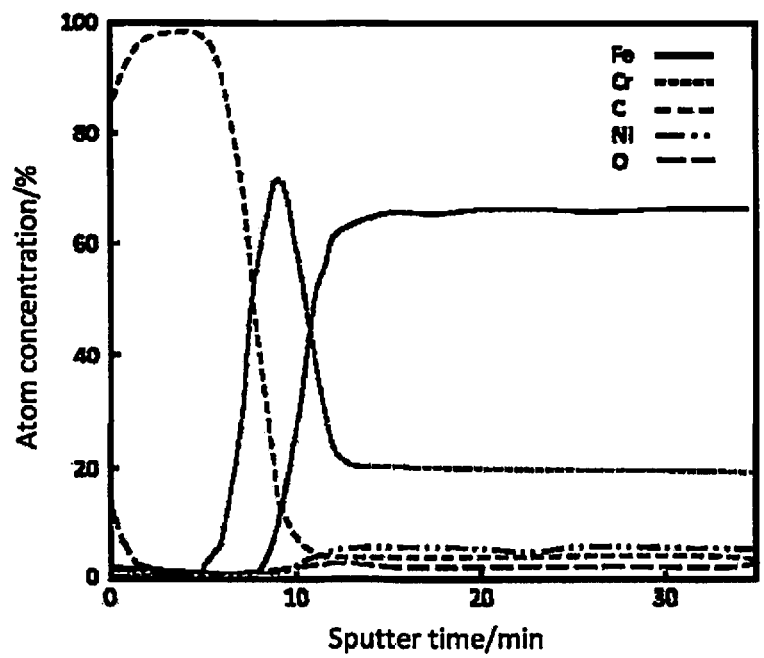
FIG. 4 consists of FIGS. 4A and 4B showing XPS measurements of the composition of examples of a substrate having a carbon layer FIG. 4A and of a substrate having a carbonitrided edge layer, 4B.

FIG. 4A shows the diagrammatic XPS elemental analysis of a GLC layer system as depicted diagrammatically in cross section in FIG. 3A. The entire layer system is to be implemented preferably in a thickness range <100 nm with a thin adhesion-promoted layer 7 of chromium. All operations can be carried out in a pressure range from $10^{-1}$-$10^{-3}$ mbar. In contrast to layer systems with a pure carbon layer 5 obtained by subplantation, and disregarding a near-surface oxygen fraction, the carbon fraction is virtually 100%. This carbon layer 5 results additionally in a hybrid layer of chromium and carbon and/or, in regions more distant from the surface, results in layers which may be made of Cr, C, Fe, and other alloy constituents of the starting material.

Figure 4B:
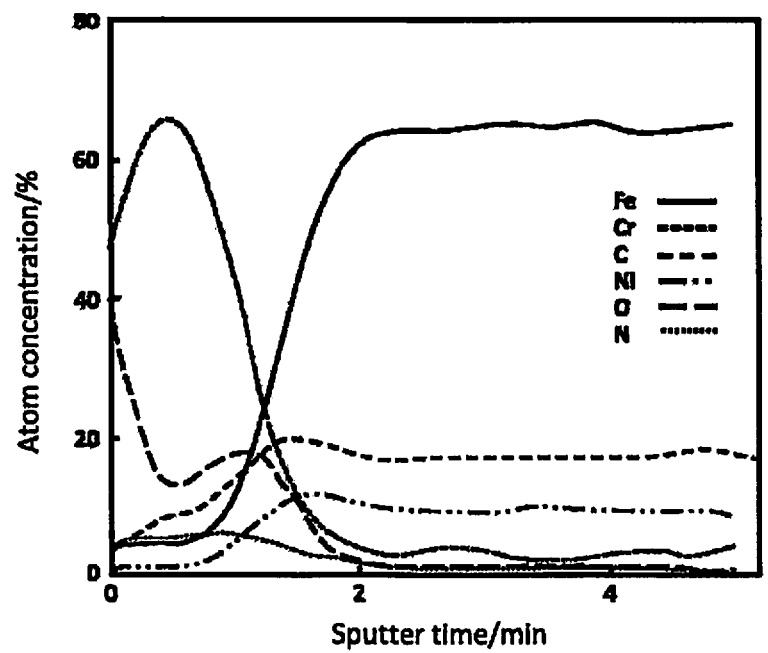

A typical XPS elemental analysis of a PNC surface treatment is shown by FIG. 4B. Here, characteristically, the carbon fraction of the carbon layer 5 obtained by subplantation is lower in comparison to a pure carbon layer 4.

The invention claimed is:

1. A bipolar plate for proton-exchange membrane PEM fuel cells, which are made with a metallic substrate and on their surface with an electrical contact resistance-reducing carbon-based layer, a layer system or a boundary layer which is made of a near-surface sp2-bonded, carbon-based layer which has a carbon fraction ranging from 50% to 100% and which is applied on a metallic substrate surface modified relative to the starting material, and
   a surface region of the metallic substrate is present as edge layer, which is made with nitride or carbon by nitriding or carburizing,
   the metallic substrate has a surface which is in contact with a gas-permeable element within the PEM cells and the surface has elevations or depressions, wherein
   the elevations or depressions on the metallic substrate surface have dimensions and geometrical design such that fibers, with which the gas-permeable element is made as a textile structure, which are
   in touching contact over their periphery with at least 10% of their outer lateral surface, on the metallic substrate surface region in which the depression is present and in which the fibers and the substrate surface touch one another.

2. The bipolar plate as claimed in claim 1, wherein an adhesion-promoting and corrosion-reducing layer of chromium or of titanium, or an adhesion-promoting layer enriched with chromium or nickel, having a thickness ranging from 2 nm to 200 nm, is formed on the surface of the metallic substrate as an interlayer beneath the carbon-based layer, the layer system or the boundary layer.

3. The bipolar plate as claimed in claim 1, wherein the carbon-based layer or the carbon-enriched layer is formed on a chromium-enriched or nickel-enriched edge layer on a surface of the metallic substrate made from stainless steel.

4. The bipolar plate as claimed in claim 1, wherein a transition zone with a carbon gradient is formed between the carbon-based layer or the carbon-enriched layer and the metallic substrate surface.

5. The bipolar plate as claimed in claim 1, wherein depressions in the metallic substrate surface are formed with the same orientation and at constant distances between adjacent depressions.

6. A method for producing a bipolar plate as claimed in claim 1, consisting of
vacuum coating the metallic substrate surface with a plasma, with a graphitic, carbon-based layer, a layer system or a boundary layer, and
positioning the metallic substrate surface in contact with the gas-permeable element in touching contact with the gas-permeable element in a PEM fuel cell and the metallic substrate surface is formed with elevations or depressions on its contact surface, which are formed by erosion of material or by an embossing method, the elevations or depressions on the metallic substrate surface have dimensions and geometric design such that fibers which make up the gas-permeable element are a textile structure in touching contact over their periphery with at least 10% of their outer lateral surface,
vacuum-coating the metallic substrate surface with a graphitic, carbon-based layer, a layer system or a boundary layer, which is made completely closed with a plurality of atomic layers disposed one above another, with a plasma which is generated with an electric arc discharge,
or
forming the edge layer by means of a plasma on the metallic substrate surface by a plasma nitriding, a plasma carburizing or a plasma carbonitriding process, while maintaining an atmosphere for this purpose.

7. The method as claimed in claim 6, in the case of carbonitriding, the edge layer is first nitrided and subsequently carburized.

8. The method as claimed in claim 6, wherein the metallic substrate surface is vacuum-coated with the graphitic, the carbon-based layer, the layer system or the boundary layer, which is made completely closed with a plurality of atomic layers disposed one above another, by a plasma which is generated with an electric arc discharge.

9. The method as claimed in claim 8, before the application of the graphitic, the carbon-based layer, the layer system or the boundary layer or before the formation of the edge layer, an oxide layer present on the metallic substrate surface is at least partially removed or reduced by an etching operation in argon or nitrogen or the oxide is reduced in a hydrogen-containing atmosphere.

10. The method as claimed in claim 8, before the application of the graphitic, the carbon-based layer, the layer system or the boundary layer, an adhesion promoter layer of chromium or titanium or a layer made with chromium and titanium is formed on the metallic substrate surface by an electric arc discharge operation under vacuum.

11. The method as claimed in claim 6, the graphitic, the carbon-based layer, the layer system or the boundary layer with ionized and accelerated carbon ions is formed, on carbon atoms present on the metallic substrate surface, at temperatures ranging from 80° C. to 600° C. with a layer thickness <80 nm.

12. The method as claimed in claim 11, wherein almost 100% ionization of the carbon atoms is attained by means of a pulsed arc evaporator.

13. The method as claimed in claim 6, a plasma nitrocarburizing for forming the edge layer in a near-vacuum, nitrogen-containing atmosphere at a pressure ranging from $10^{-1}$ mbar to $10^{-3}$ mbar by the nitriding treatment where nitrogen ions are accelerated in the direction of the substrate surface, the metallic substrate being subject to an electrically negative bias voltage ranging from 500 V to 1000 V or the metallic substrate is maintained having connection to ground potential, and a temperature ranging from 300° C.-500° C.

14. The method as claimed in claim 13, nitrogen ions are generated by means of an electric arc discharge-assisted glow discharge and are accelerated in the direction of a cooled anode, while the nitrogen ions arising are shielded and accelerated in the direction of the metallic substrate surface.

15. The method as claimed in claim 6, the erosion of material for forming elevations or depressions is attained with at least one laser beam in an irradiated region of the metallic substrate surface, or the roughness and specific surface area of the metallic substrate surface is increased by bombardment with ions.

16. The method as claimed in claim 15, the elevations or depressions are attained by at least one laser beam, by interference of a plurality of laser beams, in an irradiated region of the metallic substrate surface, or roughness and specific surface area of the metallic substrate surface is increased by bombardment with ions having an energy ranging from $10^2$ eV to $10^4$ eV, under vacuum conditions.

17. The method as claimed in claim 6, a plasma nitrocarburizing for forming the edge layer takes place in a near-vacuum, nitrogen-containing atmosphere at a pressure ranging from $10^{-1}$ mbar to $10^{-3}$ mbar by the nitriding treatment in which nitrogen ions are generated by the electrons of a carbon evaporator and are accelerated by an applied electric potential difference, in the direction of the metallic substrate surface, and the subplantation or implantation of carbon takes place in parallel by the same carbon evaporator.

* * * * *